June 15, 1954  T. R. SMITH  2,680,916
CLOTHES DRIER WATER INLET AND CONDENSER
Filed Feb. 12, 1953
6 Sheets-Sheet 1

INVENTOR.
Thomas R. Smith,
BY
Wilkinson Huxley Byron & Hume
Attys.

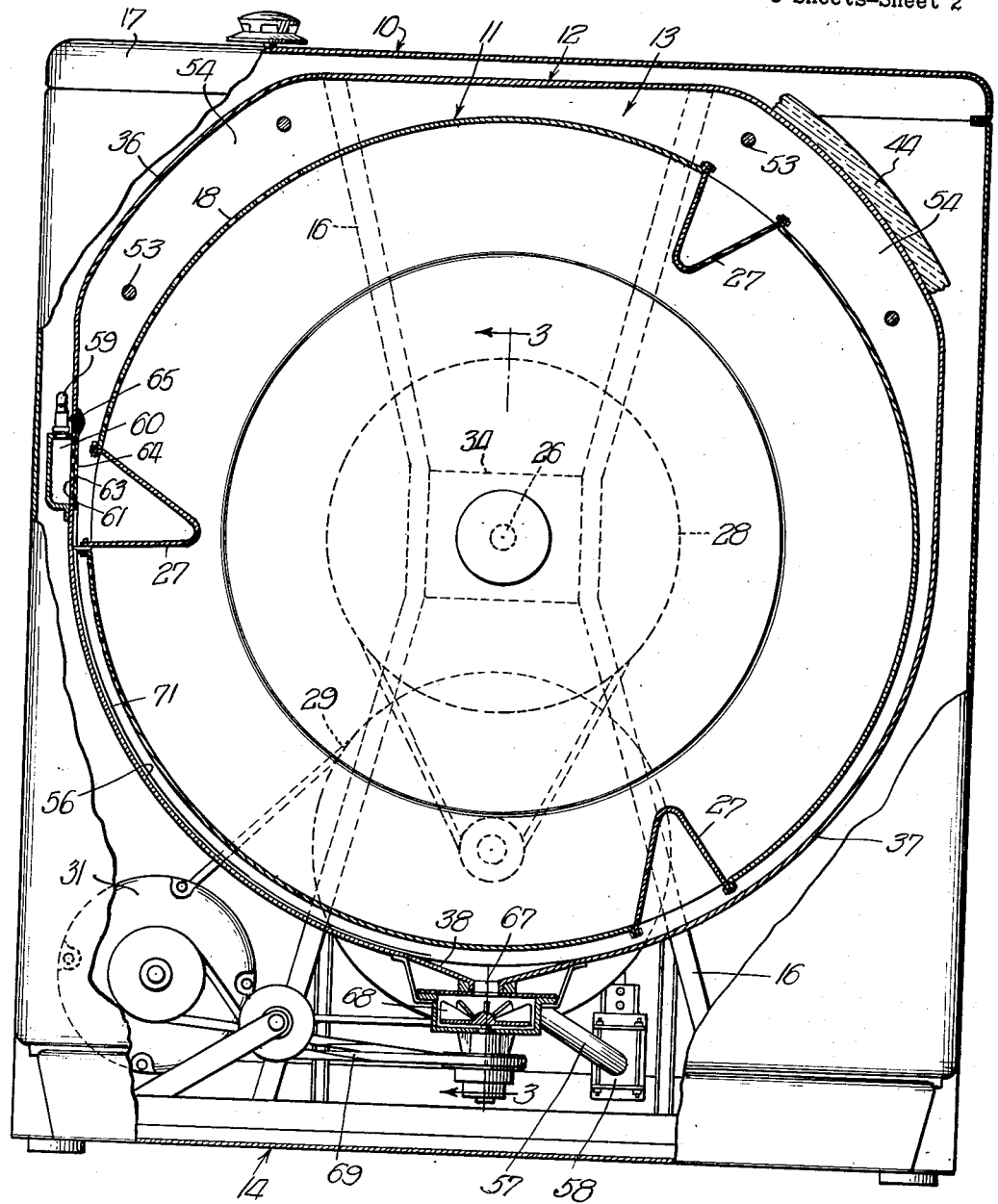

June 15, 1954  T. R. SMITH  2,680,916
CLOTHES DRIER WATER INLET AND CONDENSER
Filed Feb. 12, 1953  6 Sheets-Sheet 3
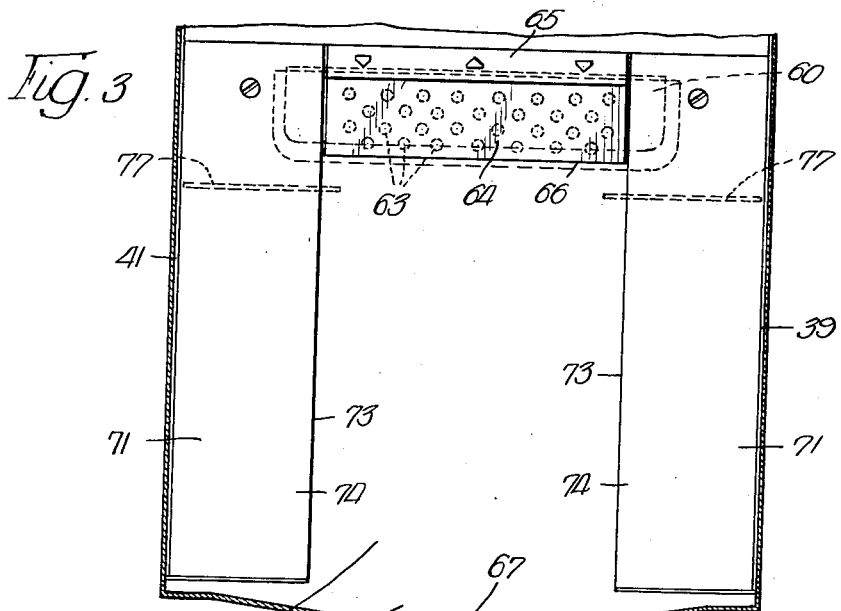
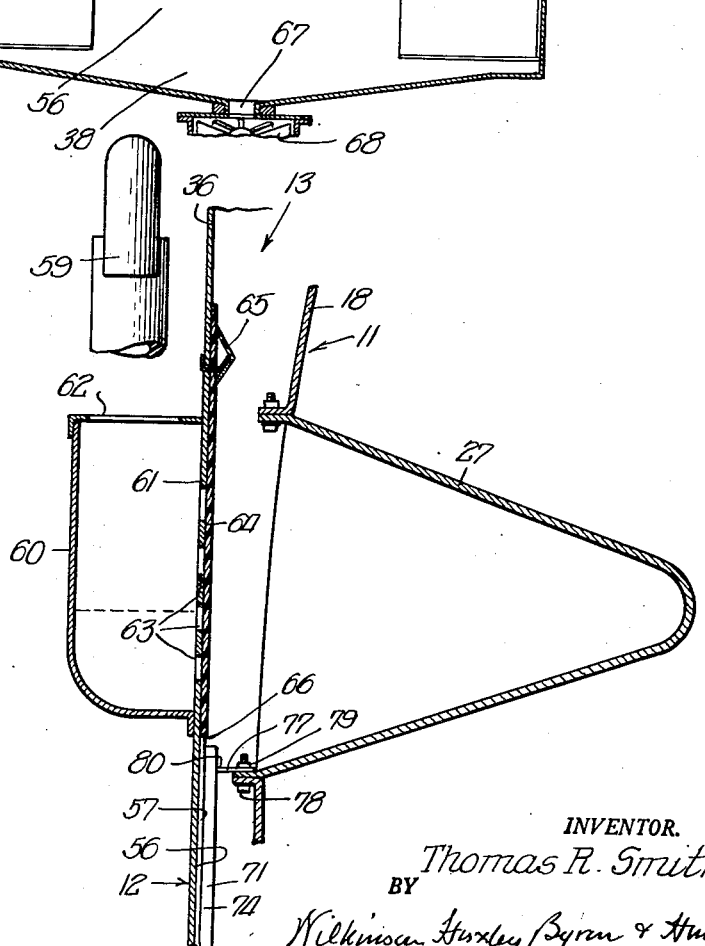
INVENTOR.
Thomas R. Smith,
BY
Wilkinson Huxley Byron & Hume
Attys June 15, 1954
T. R. SMITH
2,680,916
CLOTHES DRIER WATER INLET AND CONDENSER
Filed Feb. 12, 1953
6 Sheets-Sheet 4
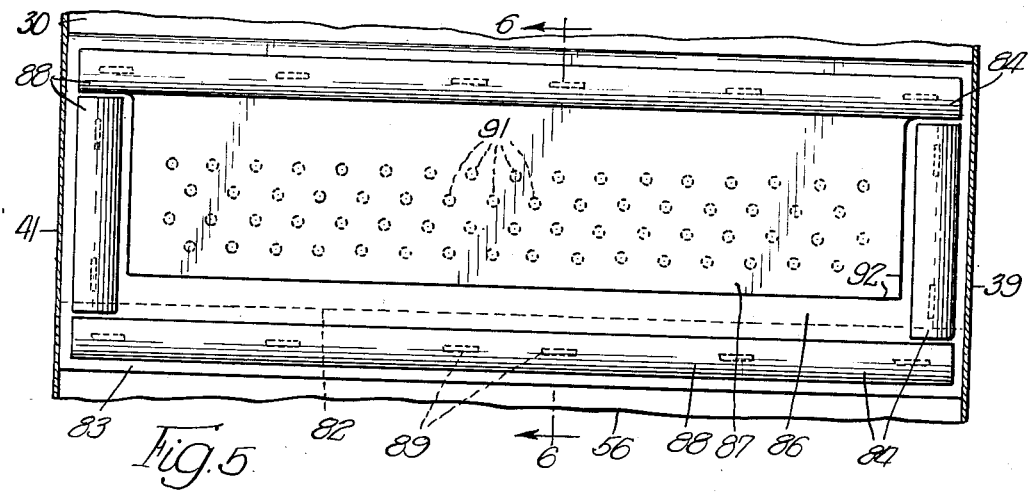
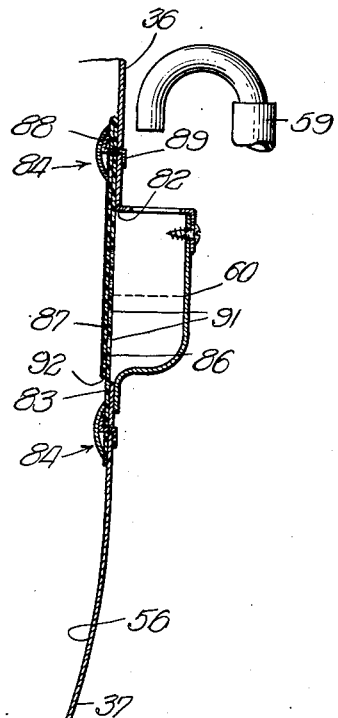
INVENTOR.
Thomas R. Smith,
BY
Wilkinson Huxley Byron & Hume
Attys.

June 15, 1954  T. R. SMITH  2,680,916
CLOTHES DRIER WATER INLET AND CONDENSER
Filed Feb. 12, 1953  6 Sheets-Sheet 5
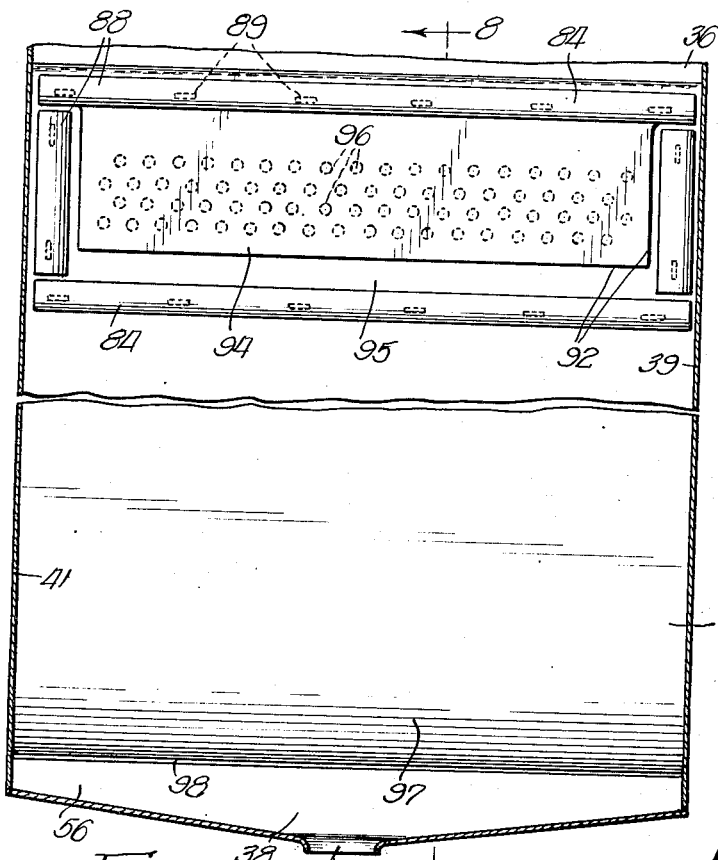
Fig. 7
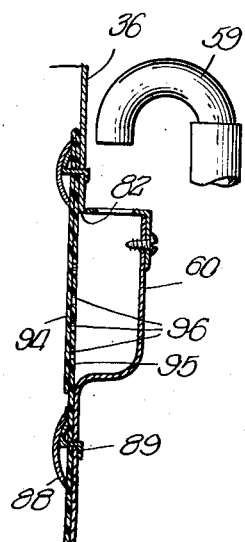
Fig. 8
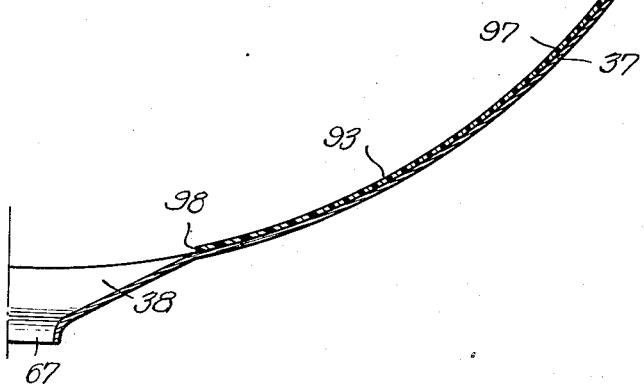
INVENTOR.
Thomas R. Smith,
BY
Wilkinson, Huxley, Byron & Hume
Attys.

June 15, 1954 T. R. SMITH 2,680,916
CLOTHES DRIER WATER INLET AND CONDENSER
Filed Feb. 12, 1953
6 Sheets-Sheet 6
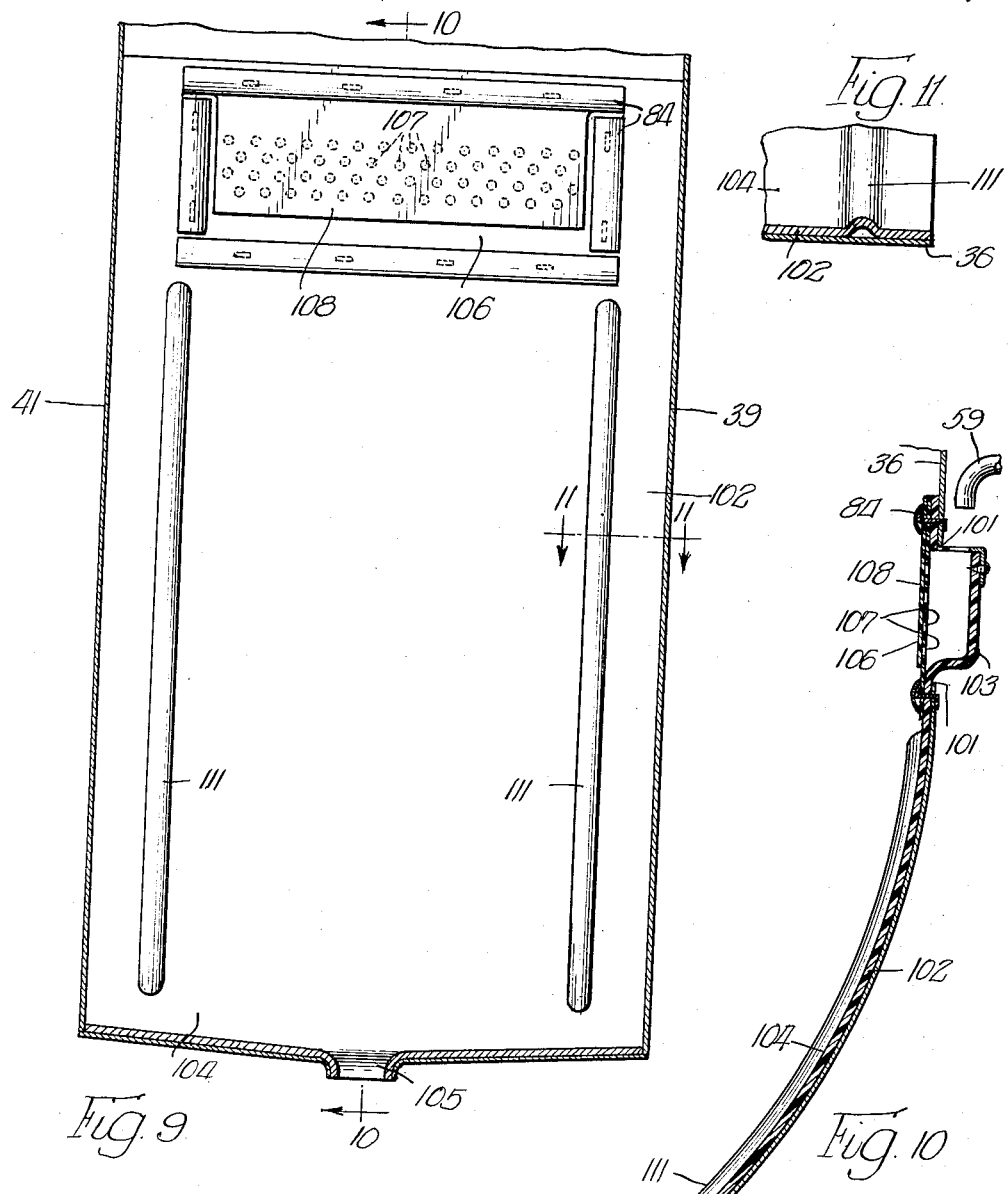
INVENTOR.
Thomas R. Smith,
BY Patented June 15, 1954

2,680,916

UNITED STATES PATENT OFFICE 2,680,916

CLOTHES DRIER WATER INLET AND CONDENSER

Thomas R. Smith, Newton, Iowa, assignor to The Maytag Company, Newton, Iowa, a corporation of Delaware Application February 12, 1953, Serial No. 336,470

18 Claims. (Cl. 34—75)

This invention relates to clothes driers, and more particularly to clothes driers of the tumbler type incorporating a vapor condensing area. In this respect, the invention is a partial continuation of the subject-matter of my copending application Serial No. 259,580, filed December 3, 1951, for Clothes Drier.

In accordance with the invention, a tumbler type clothes drier is provided which comprises a horizontally rotatable drum mounted in a substantially imperforate stationary casing. A heating element within the casing evaporates the moisture in the clothing and a portion of the lower wall of the casing is cooled by means of a thin film of water flowing downwardly by gravity over the inner surface or periphery to provide an internal condensing section or area for the vapor evaporated from the clothing. The condensing water is admitted into the interior of the casing from a distribution receptacle through a plurality of relatively small orifices or openings formed in a portion of the wall of the casing. In one form the condensing water flows over a sheet of adhesion resistant material covering the condensing section portion of the casing. By using an adhesion resistant material, the lint which contacts the cold wet surface will not adhere thereto, but will be readily moved to the drain opening by the water flowing over the surface. Also, the wall of the casing having the inlet opening therein may be formed from the same material to retard or restrain any tendency for the openings to become clogged, due to liming or the like. In still another form, the condensing section of the casing is formed from plastic thermal insulating material having a pair of parallel-spaced downwardly-directed ribs therein to confine the condensing water to a definite zone.

Attached to the casing above the inlet openings is a thin flexible flap or check valve also formed from adhesion resistant material which covers the openings. This check valve prevents the accumulation of lint about the inlet openings and if for any reason the vapor pressure exceeds the atmospheric pressure, the check valve is moved by the vapor pressure against the wall of the casing to seal against vapor leakage any of the openings above the liquid level in the distribution receptacle.

Accordingly, it is one of the objects of the invention to provide a clothes drier of the cold wall type with a closed casing having a water distributing inlet and a check valve for covering the same which readily permits the condensing water to enter the interior of the casing through the inlet but prevents the escape of the vapor therethrough.

It is another object of the invention to provide a clothes drier of the cold wall type with a closed casing having a water distributing inlet including a plurality of horizontal rows of small openings and a check valve formed from a thin sheet of adhesion resistant material carried on the interior of the casing which permits the flow of condensing water over the vapor condensing area, but prevents the escape of vapor through and the accumulation of lint about the small water inlet openings.

It is still another object of the invention to provide a clothes drier of the cold wall type having an inlet for the condensing water which includes a plurality of relatively small openings formed in a sheet of relatively thin material having adhesion resistant characteristics.

It is one of the objects of the invention to provide a clothes drier with a substantially sealed casing which has a water cooled condensing section therein, covered with a layer of adhesion resistant material to restrict the accumulation of lint thereon.

It is another object of the invention to provide a clothes drier with a substantially sealed casing having a water cooled condensing section therein which is formed from plastic material having adhesion resistance to lint and means to provide a channel for the condensing water as it flows thereover.

Other objects, features, capabilities and advantages are comprehended by the invention, as will later appear and as are inherently possessed thereby.

Referring to the drawings—

Figure 2 is a transverse vertical sectional view of the clothes drier taken generally along the line 2—2 of Figure 1 and showing the improved water inlet and check valve construction;

Figure 3 is a view taken generally along the line 3—3 of Figure 2 with the drum removed, showing in more detail the water cooled condensing area and check valve;

Figure 4 is an enlarged detail sectional view of the condensing water inlet and check valve as shown in Figure 2;

Figure 5 is an enlarged fragmentary view corresponding to Figure 3, showing a modified clothes drier construction wherein the check valve and condensing water inlet are constructed from the single sheet of adhesion resistant material;

Figure 6 is a sectional view taken on the line 6—6 of Figure 5, showing the check valve and condensing water inlet;

Figure 7 is another sectional view corresponding to Figure 3 of a still further modified casing construction for a clothes drier wherein the check valve water inlet and condensing area are constructed from a single sheet of adhesion resistant material;

Figure 8 is an enlarged sectional view of the modification as regarded along section line 8—8 of Figure 7 showing the improved condensing area;

Figure 9 is still another sectional view corresponding to Figures 3 and 7 of a still further modified casing arrangement for a clothes drier construction in which the condensing area is formed from a molded plastic material having adhesion resistant characteristics;

Figure 10 is an enlarged sectional view taken generally on the line 10—10 of Figure 9; and Figure 11 is a detail sectional view taken on the line 11—11 of Figure 9 showing a form of rib construction.

Figure 1:
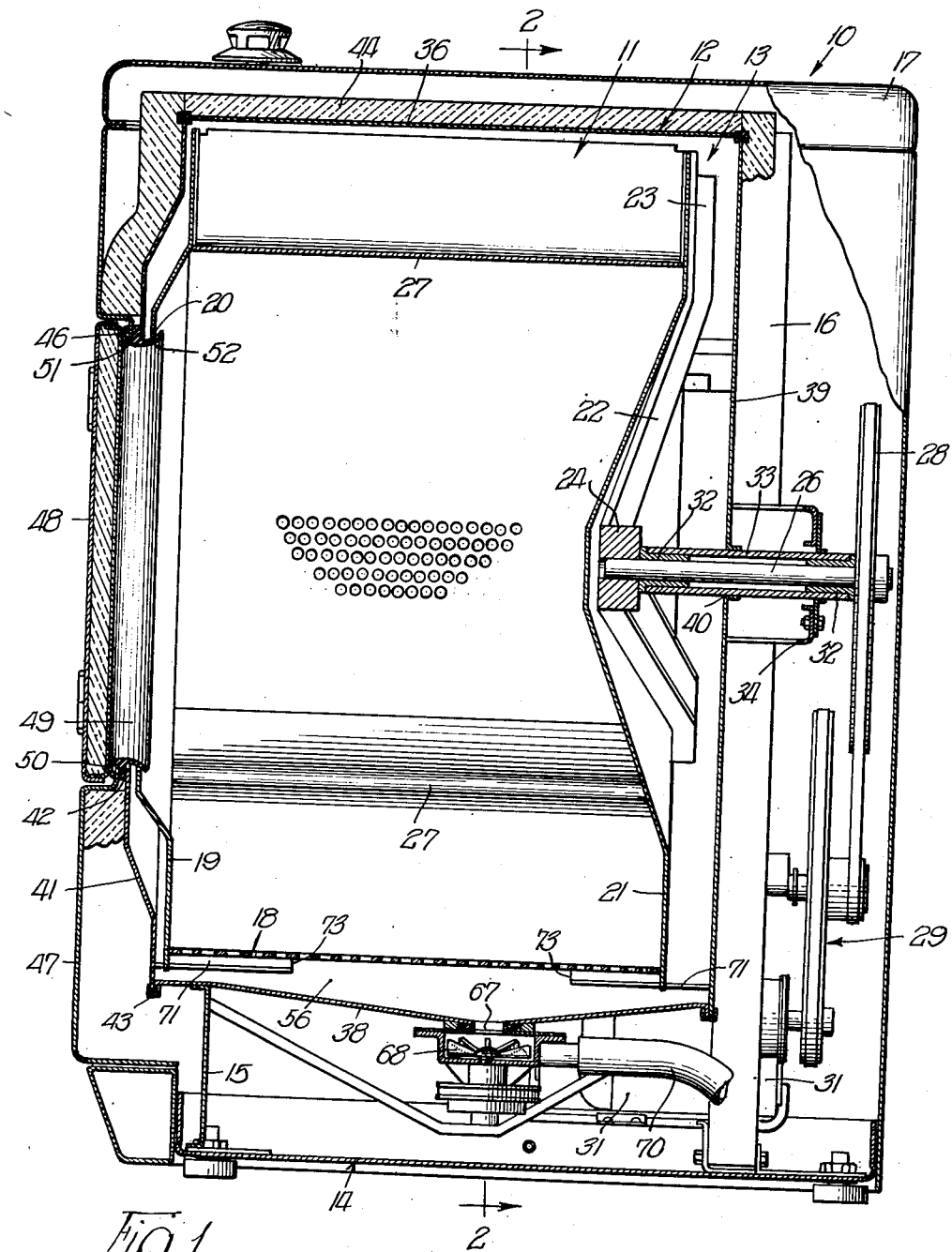
Figure 1 is a longitudinal vertical sectional view of a tumbler type clothes drier of the cold wall type to which the present invention is applicable.

Referring now more in detail to the drawings wherein are shown embodiments selected to illustrate the invention, in the general organization of Figures 1 and 2, there appears a tumbler type clothes drier 10 having a horizontally mounted rotatable drum 11 enclosed by a substantially imperforate stationary sheet metal casing or container 12 providing a drying chamber 13 in which the drum rotates. The container or casing is suitably supported on a base frame construction 14 by means of a transverse web 15 located adjacent its forward portion and an upwardly directed box or channel structure 16 carried at its back portion, and the entire assembly is surrounded by a cabinet construction 17 to provide a pleasing appearance.

The drum 11 includes an outer peripheral cylindrical wall 18, a front wall 19, having an access opening 20 therein through which the clothing to be dried is inserted and removed, and an imperforate parallel rear wall 21. A supporting spider construction 22 has its outer ends 23 secured to the rear wall 21 adjacent its outer periphery and its innermost portion terminates in a hub construction 24 for receiving the forward end of a horizontal or drum shaft 26 concentric to the drum axis for rotating the drum 11. Elevating or agitating vanes 27 forming part of the cylindrical wall 18 are spaced within the drum to provide the means for agitating the clothing in a tumbling manner when the drum is rotated.

The drum shaft 26 extends axially rearwardly from the hub 24 through the container 12 and a driven pulley 28 is secured thereon at its outermost end. This pulley may be driven at a reduced speed by means of a speed reduction pulley and belt arrangement 29 connected to any suitable drive means, such as, for example, a motor 31 resiliently mounted on the base frame construction 14. In addition, the drum shaft is preferably journaled in a pair of spaced bearings 32 mounted in a horizontally projecting tubular housing construction 33 which in turn is rigidly secured to the rear channel structure 16 through a bracket 34 to hold the drum steady during all phases of operation. It is to be understood that any suitable supporting and driving means may be provided for the rotatable drum 11.

The container or casing 12 surrounding the drum 11 includes a substantially imperforate longitudinally extending wall 36, whose lower sector 37 is generally cylindrical in transverse section and axially recessed at its lowermost portion for substantially its entire length to provide a water collecting trap or sump 38, a vertical rear wall 39 having a small opening 40 therein through which the drum shaft 26 extends, and a generally vertical front wall 41 having an access opening 42 in line with the access opening 20 in the drum. All of these elements are secured together at their marginal edges 43 in any suitable manner to provide a unitary rigid structure, and both the front and rear walls are preferably imperforate except for the centrally located openings. In addition, the outer surface of the container 12 is preferably provided with suitable heat insulating material 44 to improve the overall efficiency of the drier.

The cabinet 17 which completely encloses the container 12, base frame construction 15, drive mechanism 31, and other auxiliary equipment, has an access opening 46 in its front wall 47 in alignment with the access openings 42 and 20, respectively, in the casing and drum, and the cabinet opening 46 is provided with a hinged insulated door or closure 48 which is moved from its open to its closed position by the operator. Covering or encompassing the aligned access openings is a resilient combination gasket and seal 49 which includes a forwardly projecting portion 50 for engaging the inner surface of the door 48 to seal about the opening, a central portion 51 carried between the adjacent portions of the cabinet and casing to provide a static seal and a rearwardly projecting annular portion 52 overlapping the access opening 20 in the drum 11 to provide a deflector to prevent articles of clothing from being snared between the rotating drum and stationary casing.

In order to evaporate the moisture in the clothing, heat from a suitable gas or electric source must be supplied to the drying chamber 13. In the modification shown, there is disclosed, by way of example, a pair of standard sheathed electric heating elements 53 which are mounted within the drying chamber 13 in oppositely disposed recessed portions 54 at the upper section of the casing beyond the outer periphery 18 of the drum.

Since the stationary container 12 is not vented, means must be provided to dispose of the vapor evaporated from the moist clothing being dried; also, the lint shaken from the clothing. In the preferred form, the vapor is condensed by having it directly contact a zone or area 56 on one side of the lower cylindrical wall portion 37 of the container 12, which is directly cooled by a stream or thin film of cooling or condensing water 57 flowing over its inner surface or periphery. The cooling or condensing water may be supplied from any suitable source of supply under the control of a solenoid operated water control valve 58, and it is discharged from the downwardly directed end of a conduit 59 into a generally rectangular distribution box or receptacle 60. This receptacle is disposed at a level approximating the horizontal plane of the axis of the drum and its inner wall 61 is formed as part of the longitudinal wall 36 of the casing and forms the upper end of the condensing section or zone 56. The length of the receptacle 60 is slightly greater than the width of the condensing area, and a cover 62 prevents undue splashing of the water during the drying operation.

The portion of the casing 12 defining the inner wall 61 of the water distributing receptacle 60 is provided with a plurality of rows of parallel and horizontally spaced orifices or small openings 63 through which the water flows by gravity during the drying operation. The main reason for the rows of openings is to insure ample flow area should some or all of the openings in the lower rows become restricted or clogged.

Covering these openings 63 within the casing is a curtain type flap or check valve 64 made of relatively thin plastic material having non-sticking or adhesion characteristics, such as, for example, polytetrafluoroethylene or the like, one form of which is sold under the trade name of "Teflon," which is anchored to the casing along its upper end by means of a clamping strip or member 65 and whose sides and lower end 66 are free to swing about the clamp 65. In this manner the condensing water readily passes through the distributing orifices 63 in a multiplicity of small closely spaced streams and flows downwardly by gravity from behind the bottom 66 of the check valve 64 over the inner peripheral surface of the casing forming the condensing zone 56 in a relatively thin film. If for any reason there be a tendency for the vapor pressure within the drying chamber to increase above atmospheric pressure, the internal pressure acting on the curtain check valve 64 moves it against the wall of the casing to cover the openings 63 through which no water is flowing and prevents the escape of vapor outwardly therethrough into the interior of the cabinet 17. Also, an important function of the check valve is to cover the openings 63 at all times to prevent the accumulation of lint about the openings which would clog the same.

The lower end of the cooling condensing zone 56 is recessed as previously mentioned to provide the trap or sump 38 for collecting the condensing water, condensate and lint, and this sump has a centrally located drain outlet 67 which is the inlet of a centrifugal pump 68 mounted directly therebelow at the lowermost portion of the casing. The centrifugal pump may be rotated by the drive motor 31 through suitable belt mechanism 69, and the discharge end of the pump is connected to a conduit 70 leading to a suitable drain.

A pair of parallel spaced arcuate strips of material 71, preferably of the thermal insulating type, such as, for example, a laminated phenolic resin or the like, is secured on the inner surface or periphery of the portion of the cylindrical wall of the casing at either side of the condensing area 56 in any suitable manner. These strips are relatively wide and extend inwardly from the front and back walls 41 and 39, respectively, and from adjacent the water distributing receptacle 60 to the sump 38 at the bottom of the condensing section 56. Since the strips have radial thickness and rest upon the inner periphery of the cylindrical portion of the casing, the oppositely disposed inner edges 73 of the strips provide a channel or boundary for the condensing water flowing over the cylindrical wall and define the width of the condensing surface. The inner exposed surface 74 of the insulating strips is disposed radially inwardly with respect to the condensing surface 56 and the remainder of the cylindrical wall portion 37 of the casing, and is preferably relatively smooth and dark or black in color to increase heat absorption and further increase the temperature difference between the exposed surface and condensing surface 56. Since the thermal insulating strips 71 are relatively poor heat conductors, their exposed surfaces will tend to remain more nearly at the operating temperature of the rest of the chamber and a relatively sharp line of demarcation in temperature is thus provided at the sides of the condensing zone.

With an arrangement of this type, under exceptionally severe linting conditions or cold condensing water, lint will tend to fall and collect on the thermal strips. In order to obviate this condition, a pair of oppositely disposed radially outwardly extending thin flexible wiper strips or members 77 have anchored ends securely fastened to the outer edge of one of the elevating vanes 27 adjacent the outer periphery of the rotatable drum 11 by any suitable clamping means, such as, for example, screws 78 acting through a clamping bar 79. The length and radial width of each wiping member 77 is such that the outer free edge or end 80 contacts and brushes across the entire exposed area or surface 74 of the thermal insulating strips 71. These thin wiper strips are preferably formed from plastic material having the same non-adhesion characteristics as the check valve 64, and may be made of the same material.

Thus, as the drum 11 is rotated the free ends 80 of the wiping members 77 are moved into contact with the thermal insulating strips 71 at the upper edge and are moved downwardly over the entire exposed area 74, and any lint which may have fallen or settled on the strips during the previous portion of the revolution will be pushed ahead of the members circumferentially along the surface until it reaches the bottom edge of the strips, whereat the lint falls into the sump 38 and is conducted by the water therein to the inlet 67 of the centrifugal pump 68. Since the wiping members 77 comprise a material having non-sticking or adhesion-resistant characteristics, the lint does not tend to adhere to and accumulate thereon, and also since the exposed surface of the thermal insulating strips is relatively highly polished, there is very little or no resistance to the wiping members in moving the lint along its surface.

In the operation of a clothes drier of the type described, the operator opens the door 48 and inserts the damp clothing to be dried into the rotatable drum 11 through the aligned access openings 46, 42 and 20, respectively, after which the door is closed and latched against the door gasket 50 to seal the interior of the casing at this point.

Next, the operator adjusts or manipulates suitable control mechanism (not shown) to initiate the drying operation. This control mechanism acts to cause energization of the heating elements 53 to supply heat to the drying chamber 13 to evaporate the moisture in the clothing, start the drive motor 31 to rotate the drum 11 about its horizontal axis at approximately 45 R. P. M. to tumble and agitate the clothes, rotate the centrifugal liquid discharge pump 68, and at the same time open the water control valve 58 to permit the flow of water through the conduit 59 to deliver the same into the water distribution receptacle 60 at the upper portion of the condensing area 56. The water in the receptacle 60 flows through the orifices 63 under atmospheric pressure to provide a relatively wide and thin stream or sheet of water 57 which passes from beneath the check valve 64 and flows uniformly downwardly over the condensing area 56, longitudinally defined by the inner edges 73 of the arcuate thermal insulating strips 71. As the cooling or condensing water reaches the bottom of the casing, it is collected in the sump 38 and is conducted by gravity to its outlet opening 67 providing the inlet to the centrifugal pump 68 and is discharged therefrom to drain through the drain conduit 70.

As the heat builds up in the container 13, the moisture in the clothing being dried is evaporated therefrom. With the drum 11 being rotated in a counterclockwise direction, as viewed in Figure 1, the vapor is circulated around the inner periphery of the stationary casing 13, and in so doing a portion of the vapor directly contacts the cold water flowing over the condensing area or zone 56 and is condensed. This condensation of the vapor develops a slightly reduced pressure about the zone and results in a flow of vapor in the direction of the cold surface whereat it is condensed. As the condensing and condensate water reaches the bottom of the chamber, it flows into the sump 38 and is discharged as previously mentioned.

As the vapor moves toward the condensing section 56 of the drying chamber to be condensed, the fine air or vapor-borne lint will be carried by the vapor and it will likewise contact the condensing water and absorb enough moisture to settle thereon. Since a continuous supply of film of water is flowing over the condensing area, the lint will be washed or moved downwardly by the flowing water into the sump 38 and be discharged to drain along with the water and condensate. Likewise, the heavier lint falling out of the drum on the condensing side of the chamber is washed to the trap along with the other lint, and the heavier lint falling from the opposite side of the drum will tend to roll downwardly into the sump 38 for discharge also.

With the parallel arcuate thermal insulating strips 71 disposed at the opposite end walls of the casing and defining the axial width of the condensing zone 56 therebetween, the condensing zone proper is sharply defined and tends to restrict to a degree the accumulation of lint thereabout. However, since a flat surface of this type will collect lint under some operating conditions, the flexible wiping members 77 formed from adhesion resistant material are moved across the polished or smooth surfaces 74 by the rotating drum 11 to remove the lint by pushing it downwardly and dropping it into the sump 38 at the bottom of the container.

Unless protected lint will tend to collect about the inlet openings 63 and eventually clog them; therefore, with the check valve 64 completely covering the openings, this problem is eliminated, and since the check valve has adhesion resistant characteristics any lint which collects or accumulates along its lower edge 66 breaks loose from time to time and is flushed to drain. In addition, the check valve lying close to the openings acts to prevent the escape of vapor from the casing through the openings above the normal liquid level in the distribution receptacle 60, should the pressure in the casing tend to exceed atmospheric pressure. This reduces the corrosion problem within the confines of the cabinet.

At the end of the drying operation, when the moisture in the clothing has been reduced to the desired value, or at the end of a timed interval, suitable control means is actuated to deenergize the heating element 53 and motor 31, and close the water control valve 58 supplying the condensing water. The operator need but open the door 48, remove the dried clothing from the drum 11, and the drier is then ready for drying the next batch of moist clothing.

Referring now to Figures 5 and 6, there is shown a modified water inlet construction and, since like parts are given like reference characters, a further description of the various elements and their operation is not deemed necessary. In this instance, one side of the longitudinal wall 36 of the casing 12 at the approximate axis of rotation of the drum is slotted at 82 adjacent the water distribution receptacle 60 to provide an enlarged opening in the casing, and has a length at least equal to the width of the condensing area. A sheet of relatively thin adhesion resistant material 83, such as previously described, is folded upon itself and is securely fastened on the inner surface of the longitudinal wall 36 by means of suitable clamping members or strips 84 to provide a relatively thin inner or common wall 86 for the water distributing receptacle 60 and the casing and a check or flap valve 87. The clamping members 84 comprise elongated strips 88 of stainless steel or the like, arcuate in transverse cross-section, and spaced cleats 89 projecting backwardly therefrom, which are adapted to extend through slots or openings in the wall 36 of the casing. These cleats are bent to securely clamp and seal the edges of the flexible strip forming the common wall 86, and the upper portion of the check valve 87, against the inner surface of the casing. The adhesion resistant inner wall 86 is provided with a plurality of rows of horizontal and parallel spaced small openings or orifices 91 therein to provide the distribution means for admitting the cooling or condensing water to the interior of the casing to flow over the condensing zone 56 in a thin and wide stream. The check valve covering the openings 91 has its upper portion securely gripped by the upper clamp 84 while the side and bottom edges are relieved at 92 to clear the side and bottom clamps.

In operation, the check valve 87 portion performs the same function as previously described, in that accumulation of lint about the small distribution openings with the resultant clogging is prevented, and it prevents the escape of vapor through the openings 91 above the level of liquid in the receptacle. Also, by using the adhesion resistant material for the common wall 86 between the distributing receptacle 60 and casing, the tendency for lime deposits to form about the openings is retarded. This is because of the adhesion resistant material, and due to the fact that the impregnated fabric is relatively thin and the openings have only a very short axial length, the likelihood of closing or clogging of the orifices has been reduced considerably. It is apparent that a construction of this type may be readily substituted for the construction shown in the first embodiment.

In Figures 7 and 8 there is shown a still further modification, in which the adhesion resistant material is in the form of an elongated thin sheet 93. This sheet of material is placed in the casing over the one side of the lower cylindrical wall 37 and the upper portion of the material is folded downwardly to form a check valve 94 having its side and bottom edges relieved at 92 to cover an intermediate portion of the material which provides the common wall 95 for the distributing receptacle 60 and the wall 36 of the casing. This intermediate section has a plurality of horizontal rows of openings or orifices 96 therein, through which the condensing water flows. From the lower portion of the intermediate section, the sheet has a downwardly directed main body portion 97 whose lower edge 98 terminates adjacent the sump 38 and over which the condensing water flows in a thin film during the drying operation. The portion of the material about the opening 82 is pressed against the casing by means of the clamps 84 to provide a fluid tight seal. In a construction of this type, the upper portion including the check valve and common wall 95 acts in the manner as previously described and any lint falling on the condensing surface 97 will not adhere thereto, but readily moves with the condensing water to the sump 38 whereat it is conducted to the drain opening 67.

Figures 9, 10 and 11 disclose still another construction for the water distribution receptacle and condensing surface. In this arrangement the longitudinal wall 36 of the stationary casing is slotted at 101 for substantially its entire length and a formed plastic single piece member 102 forming an upper distribution receptacle 103, an intermediate condensing surface 104 and a lower sump 105 is mounted in the casing with the condensing surface and sump closely fitting a section of the lower portion of the interior of the casing. The distribution receptacle portion 103 of the member into which the cooling water is discharged from the conduit 59 is disposed exteriorly of the casing at the approximate axis of rotation of the drum. In this instance the inner wall 106 of the receptacle 103 having the horizontal rows of small openings 107 therein and the check valve 108 is formed by a single sheet of adhesion resistant material, as previously described in Figures 5 and 6, and both of which are clamped into position against the casing by the clamping members 84.

In order to confine the thin film of condensing water to a definite zone, the plastic condensing surface 104 has formed thereon a pair of elevated spaced and parallel guide members 111 to define the axial width of the channel for the condensing water. Since the plastic material has a smooth surface, the lint falling on the same will not tend to adhere thereto and is flushed to drain. In view of the fact that the plastic material is a relatively poor thermal conductor, the tendency for the plastic to be cooled below the dew point of the vapor beyond the guide members 111 defining the condensing zone is reduced considerably. However, in the event it is necessary, the wiping members 77 as disclosed in Figures 2 and 4 may be utilized to remove any lint which may settle thereat.

From the foregoing, it can be seen that a relatively simple drier construction has been provided, which has no lint trap, does not require the circulation of ambient air therethrough, and wherein both the heating and cooling or condensing operations are confined to definite areas within a single chamber which also houses the rotatable drum for agitating the clothing; also, that a relatively simple and effective means has been provided to prevent the escape of vapor into the interior of the surrounding cabinet; and that an improved water distribution means has been provided which tends to prevent clogging at the distribution or inlet openings. In addition, a condensing surface formed from adhesion resistant material and forming a part of the distribution and check valve construction has been provided, which prevents the accumulation of lint on the condensing surface and check valve.

With a drier construction of the type disclosed, it is obvious that the operator is not required to check and clean the lint trap, relatively large quantities of moist heated air are not discharged into the ambient atmosphere and efficient drying is accomplished regardless of the humidity conditions of the ambient atmosphere.

While I have herein described and upon the drawings shown illustrative embodiments of the invention, it is to be understood that the invention is not limited thereto, but may comprehend other constructions, arrangements of parts, details and features, without departing from the spirit of the invention.

I claim:

1. In a tumbler type clothes drier, the combination of a horizontally rotatable drum for tumbling the clothes to be dried about a horizontal axis, a substantially imperforate casing having cooperating walls openly facing said drum and defining a drying chamber therein, means for heating said chamber to evaporate the moisture in the clothing, means for cooling a portion of said walls to provide an inwardly open condensing area facing said drum within said casing to condense the vapor generated by said heating means, said cooling means including an inlet in the wall of said casing for admitting a stream of condensing water into the casing to flow downwardly over said condensing area, and a movable cover disposed over said inlet to prevent the escape of vapor therethrough.

2. In a tumbler type clothes drier, the combination of a horizontally rotatable drum for tumbling the clothes to be dried about a horizontal axis, a substantially imperforate casing having cooperating walls openly facing said drum and defining a drying chamber therein, means for heating said chamber to evaporate the moisture in the clothes, means for cooling a portion of said walls to provide an inwardly opening condensing area facing said drum within said casing to condense the vapor generated by said heating means, said cooling means including an inlet in the wall of said casing for admitting under gravity flow a stream of condensing water to flow downwardly over said condensing area in a thin film, means for conducting said condensate and condensing water to drain, and a movable cover defining a check valve for covering said inlet to prevent the escape of vapor thereat.

3. In a tumbler type clothes drier, the combination of a horizontally rotatable drum for tumbling the clothes to be dried about a horizontal axis, a substantially imperforate casing surrounding said drum and defining a drying chamber therein, means for heating said chamber to evaporate the moisture in the clothing, means for cooling a portion of said casing to provide a condensing area within said casing to condense the vapor generated by said heating means, said cooling means including an inlet for admitting a stream of condensing water to flow downwardly over said condensing area in a thin film, means for conducting said condensate and condensing water to drain, and a check valve formed from thin pliable material secured above said water inlet to cover the same to permit the flow of condensing water through said inlet but preventing the escape of vapor outwardly through the same.

4. A drier for damp clothing, comprising means for agitating the clothing, a substantially imperforate casing defining a drying chamber enclosing said means, said casing comprising cooperating walls openly facing said agitating means, means for heating said chamber to evaporate the moisture in the clothing, means for conducting condensing water over a portion of the inner surface of said wall to condense therein the vapor evaporated from the clothing and to collect the lint removed therefrom, said cooling means including a condensing water distribution receptacle attached to the exterior of said casing and having an inner wall with openings therein common to a wall of said casing, said receptacle and openings being disposed above the bottom of said casing and in direct communication with the interior thereof through said openings to introduce by gravity flow condensing water over said inner surface in a thin film, a movable cover defining a check valve carried within said casing for preventing the escape of vapor therefrom through said distribution receptacle, and means for conducting the condensate, condensing water and lint to drain.

5. A drier for damp clothing, comprising means for agitating the clothing, a substantially imperforate casing defining a drying chamber encompassing said means, said casing comprising cooperating walls openly facing said agitating means, means for heating said chamber to evaporate the moisture in the clothing, means for conducting condensing water over a portion of the inner surface of said walls to condense therein the vapor evaporated from the clothing and to collect the lint removed therefrom, said conducting means including a water distribution receptacle secured to an exterior wall of said casing above the bottom of the same and having a plurality of orifices therein to introduce by gravity flow the condensing water over a portion of the interior of said wall in a thin film, and a movable cover carried within said casing covering said orifices to prevent the escape of vapor therethrough into said receptacle.

6. A drier for damp clothing, comprising means for agitating the clothing, a substantially imperforate casing defining a drying chamber enclosing said means, means for heating said chamber to evaporate the moisture in the clothing, a water distribution receptacle secured to said casing above the bottom of the same, a sheet of adhesion resistant material having a plurality of orifices therein forming a common wall for said receptacle and casing, said orifices admitting condensing water to the interior of said casing in a thin stream to flow over a portion of the same to condense the vapor evaporated from said clothing, and a check valve formed from adhesion resistant material secured to the interior of said casing and covering said orifices to prevent the contact of lint on and the escape of vapor through said orifices.

7. A drier for damp clothing, comprising means for agitating the clothing, a substantially imperforate casing defining a drying chamber enclosing said means, means for heating said chamber to evaporate the moisture in the clothing, a water distribution receptacle secured to said casing above the bottom of the same, a sheet of adhesion resistant material having a plurality of orifices therein forming a common wall for said receptacle and casing and a downwardly directed portion providing a condensing surface, said orifices admitting condensing water to the interior of said casing in a thin film to flow over said downwardly directed adhesion resistant material to condense the vapor evaporated from the clothing and collect the lint shaken therefrom, means for conducting the condensing water, condensate and lint to drain, and a check valve formed from adhesion resistant material secured to said casing above said orifices and extending downwardly to cover the same to permit the entrance of condensing water to the casing but prevent the escape of vapor through the orifices and the accumulation of lint about the same.

8. A drier for damp clothing, comprising a substantially imperforate casing defining a drying chamber and provided with an access opening therein and a lower section, a closure for said opening, means for agitating the clothing in said chamber, means for heating said chamber to evaporate the moisture in the clothing, means for supplying condensing water to the interior of said casing to flow over a portion of the lower section in a relatively thin film to condense the vapor generated therein and to collect the lint thereat, said supplying means including a condensing water distributing receptacle disposed above the bottom of said casing and having a common wall with said casing with a plurality of openings therein, said opening admitting the condensing water to the interior of said casing to flow the same over the portion of said lower section, and a check valve disposed in said casing to cover the openings to prevent the escape of vapor therethrough and the accumulation of lint thereat.

9. A drier for damp clothing, comprising a substantially imperforate casing defining a drying chamber and provided with an access opening therein and a lower section, a closure for said opening, means for agitating the clothing in said chamber, means for heating said chamber to evaporate the moisture in the clothing, means for supplying condensing water to the interior of said casing to flow over a portion of said lower section in a relatively thin film to condense the vapor generated therein and to collect the lint thereat, said supplying means including a water distributing receptacle disposed above the bottom of said casing and having a common wall of adhesion resistant material with said casing and with a plurality of openings therein, said openings admitting the condensing water to the interior of said casing to flow the same over the portion of said lower section, and a check valve of adhesion resistant material disposed in said casing to cover the openings to prevent the escape of vapor therethrough and the accumulation of lint thereat.

10. A drier for damp clothing, comprising a substantially imperforate casing defining a drying chamber and provided with an access opening therein and a lower section, a closure for said opening, means for agitating the clothing in said chamber, means for heating said chamber to evaporate the moisture in the clothing, means for supplying condensing water to the interior of said casing to flow over a portion of the lower section in a relatively thin film to condense the vapor generated therein and to collect the lint thereat, said supplying means including a water distributing receptacle disposed above the bottom of said casing and having a common wall of adhesion resistant material with said casing and a plurality of openings therein, a sheet of adhesion resistant material covering a portion of said lower section of said casing below said openings and over which the condensing water flows to the bottom of said casing to condense the vapor evaporated from the clothing and to remove the lint settling thereon, means for removing the condensate, condensing water and lint from the bottom of said casing, and a relatively thin adhesion resistant check valve carried by said casing to cover said openings to prevent the escape of vapor through said openings and the accumulation of lint thereat.

11. A drier for damp clothing, comprising a substantially imperforate casing defining a drying chamber and provided with an access opening therein and a lower section, a closure for said opening, means for agitating the clothing in said chamber, means for heating said chamber to evaporate the moisture in the clothing, a formed sheet having a lower portion covering the interior of said lower section of said casing and an upper portion forming a water distributing receptacle, said receptacle and casing having a common wall with a plurality of openings therein to direct condensing water over the lower portion of said sheet within the casing to condense the vapor evaporated from the clothing and remove the lint collecting thereon, means for conducting the condensing water, condensate and lint to drain, and means including a thin sheet of flexible adhesion resistant material secured to the interior of said casing and covering said openings to provide a check valve to prevent the escape of vapor through said openings and the accumulation of lint thereat.

12. A drier for damp clothing, comprising a drum mounted to rotate about a horiontal axis to agitate the clothing, a casing including end walls and a longitudinally extending wall having a generally cylindrical lower section surrounding said drum and defining a drying chamber, one of said end walls having an access opening therein, a closure for said opening, means for heating said chamber to evaporate the moisture in said clothing, means for conducting condensing water over a portion of the generally cylindrical lower section of said casing to condense therein the vapor evaporated from the clothing and to collect the lint removed therefrom, said conducting means including a water distribution receptacle having a plurality of orifices therein secured to said casing above the bottom of the same for directing the condensing water over the interior of said casing in a thin film, and means including a check valve covering said orifices to prevent the escape of vapor therethrough into said receptacle.

13. A drier for damp clothing, comprising a drum mounted to rotate about a horizontal axis to agitate the clothing, a casing having a longitudinally extending wall with a generally cylindrical lower section and end walls surrounding said drum and defining a drying chamber, one of said end walls having an access opening therein, a closure for said opening, means for heating said chamber to evaporate the moisture in said clothing, a water distribution receptacle secured to the longitudinal wall of said casing above the bottom of the same, a sheet of adhesion resistant material having a plurality of orifices therein forming a common wall for said receptacle and casing, said orifices admitting condensing water to the interior of said casing to flow over a portion of the generally cylindrical section to condense the vapor evaporated from said casing, and an integral check valve formed from the adhesion resistant material secured to the interior of said casing above said orifices to cover the same to prevent the escape of vapor from the casing through said orifices.

14. A drier for damp clothing, comprising a drum mounted to rotate about a horizontal axis to agitate the clothing, a casing having a longitudinally extending wall with a generally cylindrical lower section and end walls surrounding said drum and defining a drying chamber, one of said end walls having an access opening therein, a closure for said opening, means for heating said chamber to evaporate the moisture in said clothing, a water distribution receptacle secured to said casing above the bottom of the same, a sheet of adhesion resistant material having a plurality of orifices therein forming a common wall for said receptacle and casing and a downwardly directed portion providing a condensing surface resting on a portion of the generally cylindrical section of said longitudinally extending wall, said orifices admitting condensing water to the interior of said casing in a thin film to flow over said downwardly directed adhesion resistant material to condense the vapor evaporated from the clothing and trap the lint shaken therefrom, means for conducting the condensing water, condensate and lint to drain, and a check valve formed from adhesion resistant material secured to said casing above said orifices and extending downwardly to cover the same to permit the entrance of condensing water to the casing but prevent the escape of vapor through the orifices.

15. A drier for damp clothing, comprising a drum mounted to rotate about a generally horizontal axis to agitate the clothing, a casing having a longitudinally extending wall whose lower section is generally circular in transverse section and end walls for surrounding said drum to define a drying chamber, one of said walls having an access opening therein, a closure for said access opening, means for heating said chamber to evaporate the moisture in said clothing, a water distribution receptacle secured to the exterior of said casing at a level approximating the axis of said drum, a common wall between said receptacle and said casing having a plurality of rows of horizontally spaced openings therein for admitting condensing water over a portion of the lower cylindrical section of said longitudinal wall in a relatively thin and wide film to provide a condensing area for the evaporated vapor, a sump formed at the bottom of the casing for collecting the condensate and condensing water, means including a pump carried at the bottom of the casing for discharging the condensing water, condensate and lint to drain, and a relatively thin and flexible adhesion resistant check valve secured to the interior of said casing above said openings and covering the same to permit the entrance of condensing water to said condensing area but to prevent the escape of vapor through the accumulation of lint about the condensing water distribution openings.

16. A drier for damp clothing, comprising a drum mounted to rotate about a generally horizontal axis to agitate the clothing, a casing having a longitudinally extending wall whose lower section is generally circular in transverse section and end walls for surrounding said drum to define a drying chamber, one of said walls having an access opening therein, a closure for said access opening, means for heating said chamber to evaporate the moisture in said clothing, a water distribution receptacle secured to the exterior of said casing at a level approximating the axis of said drum, a common wall of adhesion resistant material between said receptacle and said casing having a plurality of rows of horizontally spaced openings therein for admitting condensing water over a portion of the lower cylindrical section of said longitudinal wall in a relatively thin and wide film to provide a condensing area for the evaporated vapor, a sump formed at the bottom of the casing for collecting the condensate and condensing water, means including a pump carried at the bottom of the casing for discharging the condensing water, condensate and lint to drain, and a relatively thin and flexible adhesion resistant check valve secured to the interior of said casing above said openings and covering the same to permit the entrance of condensing water to said condensing area but to prevent the escape of vapor through and the accumulation of lint about the condensing water distribution openings.

17. A drier for damp clothing, comprising a drum mounted to rotate about a generally horizontal axis to agitate the clothing, a casing having a longitudinally extending wall whose lower section is generally circular in transverse section and end walls for surrounding said drum to define a drying chamber, one of said walls having an access opening therein, a closure for said access opening, means for heating said chamber to evaporate the moisture in said clothing, a water distribution receptacle secured to the exterior of said casing at a level approximating the axis of said drum, a common wall of adhesion resistant material between said receptacle and said casing having a plurality of rows of horizontally spaced openings therein for admitting condensing water over a portion of the lower cylindrical section of said longitudinal wall in a relatively thin and wide film to provide a condensing area for the evaporated vapor, a sheet of adhesion resistant material covering said condensing area to resist the accumulation of lint and over which the condensing water flows, a sump formed at the bottom of the casing for collecting the condensate and condensing water, means including a pump carried at the bottom of the casing for discharging the condensing water, condensate and lint to drain, and a relatively thin and flexible adhesion resistant check valve secured to the interior of said casing above said openings and covering the same to permit the entrance of condensing water to said condensing area but to prevent the escape of vapor through and the accumulation of lint about the condensing water distribution openings.

18. A drier for damp clothing, comprising a drum mounted to rotate about a generally horizontal axis to agitate the clothing, a casing having a longitudinally extending wall whose lower section is generally circular in transverse section and end walls for surrounding said drum to define a drying chamber, one of said walls having an access opening therein, a closure for said access opening, means for heating said chamber to evaporate the moisture in said clothing, a formed sheet of adhesion resistant material having a lower portion covering a portion of said lower cylindrical section and an upper portion forming a condensing water distribution receptacle exteriorly of said casing at a level approximating the axis of said drum, a common wall of adhesion resistant material between said receptacle and said casing having a plurality of rows of horizontally spaced openings therein for admitting condensing water to flow over the lower portion of said formed sheet in a relatively thin and wide film to provide a condensing area for the evaporated vapor, a sump formed at the bottom of the casing for collecting the condensate and condensing water, means including a pump carried at the bottom of the casing for discharging the condensing water, condensate and lint to drain, and a relatively thin and flexible adhesion resistant check valve secured to the interior of said casing above said openings and covering the same to permit the entrance of condensing water to said condensing area but to prevent the escape of vapor through and the accumulation of lint about the condensing water distribution openings.

References Cited in the file of this patent

UNITED STATES PATENTS

| Number | Name | Date |
| --- | --- | --- |
| 1,381,002 | O'Neil | June 7, 1921 |
| 2,402,741 | Draviner | June 25, 1946 |
| 2,555,821 | Smith | June 5, 1951 |
| 2,562,533 | Dunlap | July 31, 1951 |
| 2,590,295 | Constantine | Mar. 25, 1952 |
| 2,644,245 | Hammell et al. | July 7, 1953 |

FOREIGN PATENTS

| Number | Country | Date |
| --- | --- | --- |
| 979,825 | France | Dec. 13, 1950 |